(12) United States Patent
Yu

(10) Patent No.: US 10,532,003 B2
(45) Date of Patent: Jan. 14, 2020

(54) GUIDE ROBOT AND METHOD AND SYSTEM FOR OPERATING THE SAME

(71) Applicant: BOE TECHNOLOGY GROUP CO., LTD., Beijing (CN)

(72) Inventor: Zhanquan Yu, Beijing (CN)

(73) Assignee: BOE TECHNOLOGY CO., LTD., Beijing (CN)

( * ) Notice: Subject to any disclaimer, the term of this patent is extended or adjusted under 35 U.S.C. 154(b) by 2 days.

(21) Appl. No.: 15/571,635

(22) PCT Filed: Jun. 2, 2017

(86) PCT No.: PCT/CN2017/086964
§ 371 (c)(1),
(2) Date: Nov. 3, 2017

(87) PCT Pub. No.: WO2017/206944
PCT Pub. Date: Dec. 7, 2017

(65) Prior Publication Data
US 2018/0221240 A1    Aug. 9, 2018

(30) Foreign Application Priority Data

Jun. 3, 2016   (CN) .......................... 2016 1 0391227

(51) Int. Cl.
| | | |
|---|---|---|
| *A61H 3/06* | (2006.01) | |
| *A61H 3/04* | (2006.01) | |
| *G09B 21/00* | (2006.01) | |

(52) U.S. Cl.
CPC .............. *A61H 3/061* (2013.01); *A61H 3/04* (2013.01); *G09B 21/006* (2013.01); *A61H 2201/1638* (2013.01); *A61H 2201/5048* (2013.01)

(58) Field of Classification Search
CPC .. A61H 3/061; A61H 3/04; A61H 2201/1638; A61H 2201/5048;
(Continued)

(56) References Cited

U.S. PATENT DOCUMENTS 5,687,136 A * 11/1997 Borenstein ............. A61H 3/061
367/116
2009/0173561 A1 * 7/2009 Moriguchi ............... B25J 5/007
180/167

(Continued)

FOREIGN PATENT DOCUMENTS

| CN | 101108480 A | 1/2008 |
|----|-------------|--------|
| CN | 201847887 U | 6/2011 |

(Continued)

OTHER PUBLICATIONS

International Search Report & Written Opinion dated Sep. 1, 2017, regarding PCT/CN2017/086964.
(Continued)

*Primary Examiner* — James J Yang
(74) *Attorney, Agent, or Firm* — Intellectual Valley Law, P.C.

(57) ABSTRACT

The present application discloses a guide robot. The guide robot includes a speed sensor, configured for detecting a user's walking speed; and a driving device, configured for controlling a moving speed of the guide robot based on the user's walking speed so that the moving speed of the guide robot is compatible with the user's walking speed.

12 Claims, 7 Drawing Sheets

(58) Field of Classification Search
CPC ...... A61H 2201/5043; A61H 2201/501; A61H 2003/043; A61H 2201/5079; A61H 2201/5058; G09B 21/006; G01S 13/58; G01S 2013/9321; G01S 13/931

See application file for complete search history.

(56) References Cited

U.S. PATENT DOCUMENTS

| | | | |
|---|---|---|---|
| 2011/0023920 | A1 | 2/2011 | Bolton |
| 2012/0029696 | A1* | 2/2012 | Ota .................. A61H 3/04 700/250 |
| 2014/0188275 | A1* | 7/2014 | Lee .................. B25J 5/007 700/257 |
| 2015/0196449 | A1* | 7/2015 | Ahn .................. A61H 3/00 623/27 |
| 2015/0297439 | A1* | 10/2015 | Karlovich ........... A63B 22/02 280/650 |
| 2016/0171303 | A1* | 6/2016 | Moore .............. G06K 9/00671 382/153 |

FOREIGN PATENT DOCUMENTS

| | | |
|---|---|---|
| CN | 102614068 A | 8/2012 |
| CN | 202751805 U | 2/2013 |
| CN | 103126862 A | 6/2013 |
| CN | 103892995 A | 7/2014 |
| CN | 203841993 U | 9/2014 |
| CN | 104433029 A | 3/2015 |
| CN | 104644400 A | 5/2015 |
| CN | 205251976 U | 5/2016 |
| CN | 205796008 U | 12/2016 |
| DE | 202011108171 U1 | 8/2012 |
| KR | 20050056307 A | 6/2005 |

OTHER PUBLICATIONS

Chinese Search Report in the Chinese Patent Application No. 201610391227.2, dated Sep. 22, 2016; English translation attached.
First Office Action in the Chinese Patent Application No. 201610391227.2, dated Dec. 1, 2016; English translation attached.
Second Office Action in the Chinese Patent Application No. 201610391227.2, dated Mar. 8, 2017; English translation attached.
Third Office Action in the Chinese Patent Application No. 201610391227.2, dated May 12, 2017; English translation attached.
Notification to Grant Patent Right for Invention in the Chinese Patent Application No. 201610391227.2, dated Jul. 25, 2017; English translation attached.
"The blind guiding robot", Xuefeng Han, China Master's Theses (Nov. 30, 2009).
"Development of the robotic travel aid 'HITOMI'", Shinji Kotani, Robotics and Autonomous System (Dec. 31, 1996).
"Intelligent walkers for the elderly: performance and safety testing of VA-PAMAID robotic walker", Andrew J. Rentschler, vol. 40, Journal of Rehabilitation Research and Development (Oct. 31, 2003).

* cited by examiner

GUIDE ROBOT AND METHOD AND SYSTEM FOR OPERATING THE SAME

CROSS-REFERENCE TO RELATED APPLICATION

This application is a national stage application under 35 U.S.C. § 371 of International Application No. PCT/CN2017/086964, filed Jun. 2, 2017, which claims priority to Chinese Patent Application No. 201610391227.2, filed on Jun. 3, 2016, the content of which is incorporated by reference in the entirety.

CROSS-REFERENCE TO RELATED APPLICATION

This application claims priority to Chinese Patent Application No. 201610391227.2, filed on Jun. 3, 2016, the content of which is incorporated by reference in the entirety.

TECHNICAL FIELD

The present invention relates to display technology, more particularly, to a guide robot and a method for operating the guide robot.

BACKGROUND

Tens of millions of visually impaired persons need to deal with basic needs in everyday life such as moving around and running errands. Helping visually impaired persons and making it more convenient for them to be mobile are very important. Conventionally, visually impaired persons use canes and/or guide dogs when going out. However, the conventional means have limitations and may not satisfy the guiding demands well from visually impaired persons.

SUMMARY

In one aspect, the present invention provides a guide robot. The guide robot includes a speed sensor, configured for detecting a user's walking speed; and a driving device, configured for controlling a moving speed of the guide robot based on the user's walking speed so that the moving speed of the guide robot is compatible with the user's walking speed.

Optionally, the speed sensor and the driving device are placed on or in the robot body.

The guide robot further includes a handle and a handle control device. When the guide robot is activated, the handle control device moves the handle up and down; and when receiving a stop command, the handle control device stops moving the handle. Further, when the handle detects a user's hand is placed on the handle, the handle sends a stop command to the handle control device.

Optionally, the handle control device includes a track rail along a vertical direction and a motor, the handle having a circular shape surrounding the robot body. Optionally, the handle is arranged on the track rail to move up and down along the track rail; and the motor is configured to drive the handle to move along the track rail.

Optionally, the driving device includes a walking base-frame for moving the robot guide and a speed control device for controlling a moving speed of the walking base-frame, the moving speed of the walking-base frame being the moving speed of the guide robot.

Optionally, the guide robot further includes a flexible connecting device for flexibly connecting the walking base-frame and the robot body, such that the walking base-frame and the robot body may slide relative to one another along a horizontal direction.

Optionally, the speed sensor is placed on the walking base-frame.

Optionally, the guide robot further includes a voice reminder device, configured for reminding the user a location of the guide robot when the guide robot is activated.

Optionally, the guide robot further includes a voice recognition device, configured for recognizing a user's voice and activating the guide robot when recognizing the user's voice.

Optionally, the driving device is configured to determine a user's location based on the user's voice and drive the guide robot to the user's location.

Optionally, the guide robot further includes an obstacle avoidance sensor configured for detecting if an obstacle is located in a route of the guide robot. When the obstacle avoidance sensor detects an obstacle in the route of the guide robot, the driving device adjusts the route of the guide robot to avoid the obstacle.

Optionally, the guide robot includes a radar device for scanning objects surrounding the guide robot. The driving device generates a map reflecting a surrounding environment of the guide robot based on objects scanned by the radar device, and controls a route of the guide robot based on the map.

Optionally, the guide robot further includes an image sampling device, configured for sampling images surrounding the guide robot; a communication device, configured for sending sampled images to a remote terminal and receive a voice message sent from the remote terminal; and a voice output device, configured for outputting the voice message received by the communication device.

Optionally, the guide robot further includes a sound sampling device configured for sampling sound surrounding the guide robot so that the communication device sends sampled sound to the remote terminal.

Optionally, the guide robot further includes a display device configured for displaying images received by the communication device from the remote terminal.

Optionally, the robot body is a cylinder shape.

Another aspect of the present disclosure provides a method for operating a guide robot. The guide robot includes a speed sensor, a driving device, a voice recognition device, a voice reminder device, and a handle. The method includes the steps of: detecting the user's voice command; activating the guide robot based on the user's voice command; determining the user's location based on the user's voice command and moving to the user's location; generating an audio reminder to remind the user a position of a handle; driving the handle to move up or down; detecting a user's hand being placed on the handle; stopping moving the handle; moving the guide robot; detecting the user's walking speed; and adjusting a speed of the guide robot based on the detected user's walking speed.

Optionally, the method further includes connecting to a remote terminal through a communication device based on a user's command; displaying images and voices received from the remote terminal; and sending images and voices from environment surrounding the user to the remote terminal.

Optionally, if the guide robot is not activated, the guide robot returns to detecting the user's voice command.

Another aspect of the present disclosure provides a system for managing guide robots in a defined space including a remote control terminal and a plurality of guide robots. The remote control terminal stores data mapping objects in the defined space. The objects include fixed objects and moving objects in the defined space. A guide robot responds to a user's voice command; adjusts a handle position based on an input from the user, and detects a walking speed of the user and adjusts its own moving speeding accordingly. Further, the remote terminal controls the plurality of guide robots based on users' voice commands and the data mapping of the objects in the defined space.

Optionally, each guide robot is the guide robot described above.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Conventional technology provides some guide robots for the visually impaired. These guide robots can automatically guide visually impaired persons when walking. However, the moving speed of these guide robots is often fixed. As a result, it can be difficult for a guide robot to adapt to different walking speeds or different visually impaired users.

The present disclosure provides a guide robot.

Figure 1:
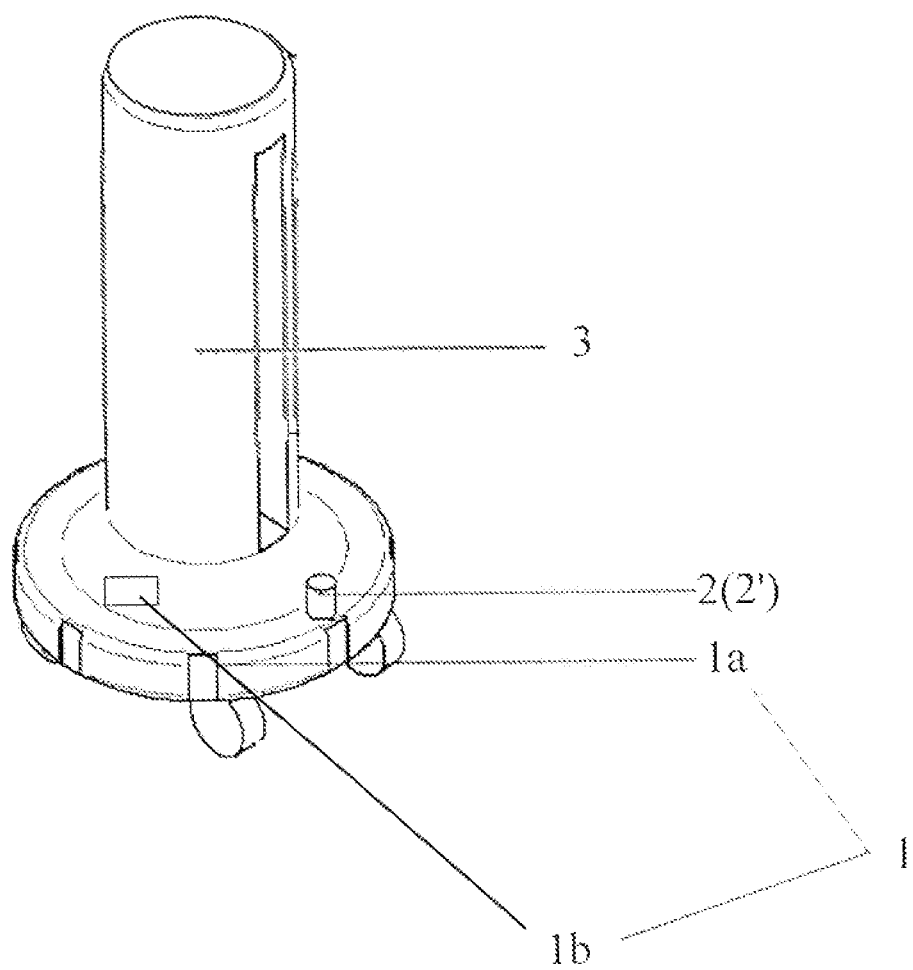
FIG. 1 illustrates an exemplary guide robot according to various embodiments of the present disclosure.
Figure 2:
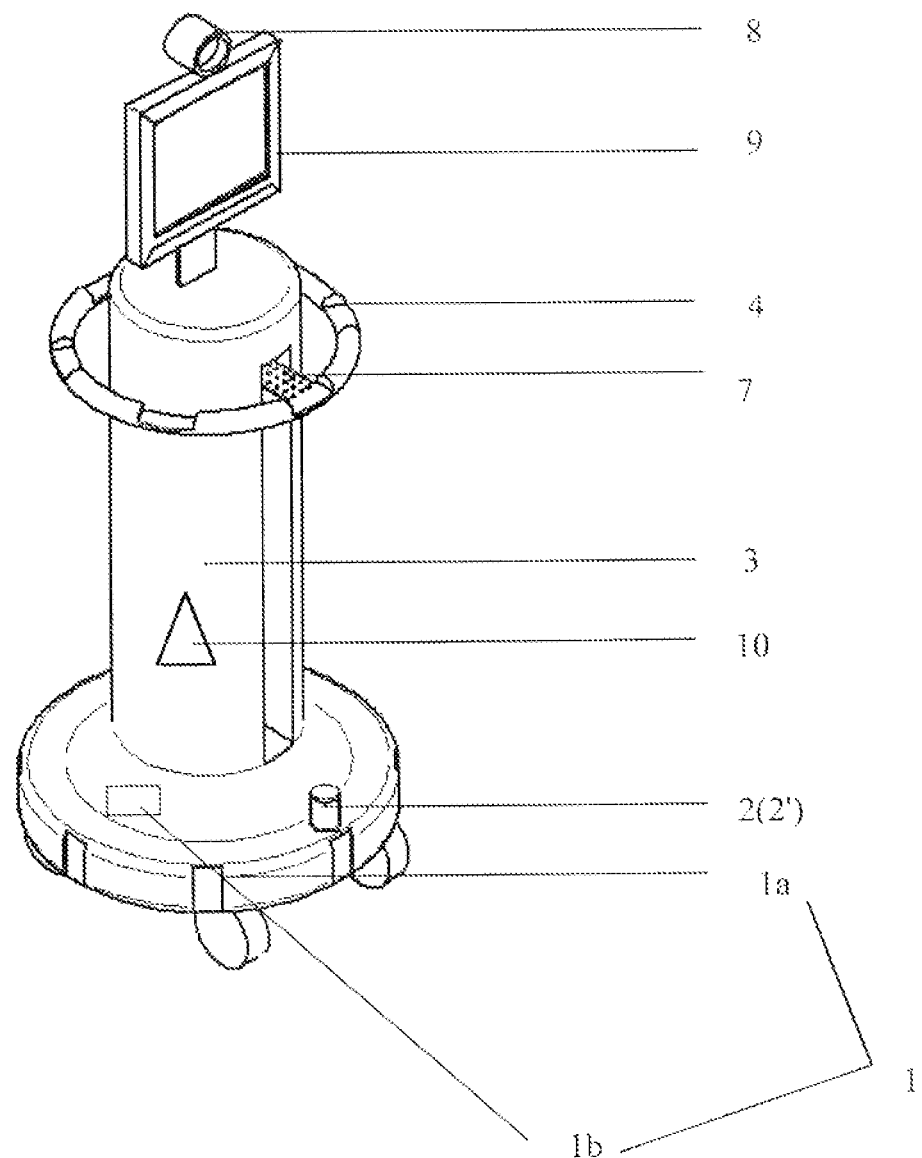
FIG. 2 illustrates another exemplary guide robot according to various embodiments of the present disclosure.

As shown in FIGS. 1 and 2, the guide robot may include a robot body 3, a driving device 1 on the robot body 3, and a speed sensor 2 on the robot body 3. The speed sensor 2 may be configured to detect the user's walking speed or moving speed. The driving device 1 may be configured to control the moving/walking speed of the guide robot based on the moving/walking speed of the user, detected by the speed sensor 2 such that the walking speed of the guide robot may match the walking speed of the user. The guide robot can thus guide the user while the user walks comfortably.

The disclosed guide robot may include a driving device and a speed sensor. The driving device may control the walking speed of the guide robot based on the user's walking speed, detected by the speed sensor, such that the walking speed of the guide robot may match the walking speed of the user. Thus, the disclosed guide robot may have better adaptation to the user's walking speed.

Figure 3:
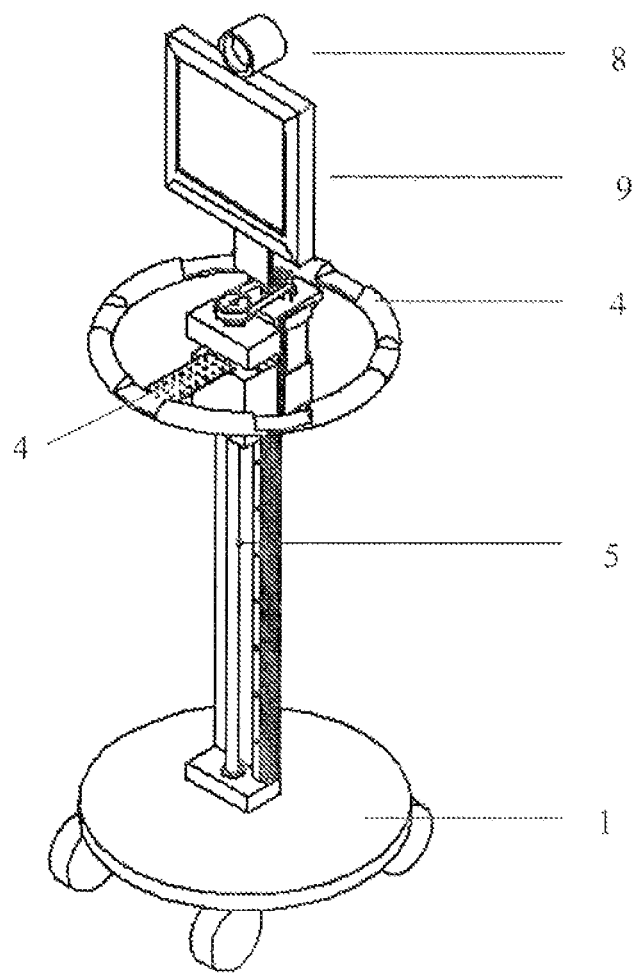
FIG. 3 illustrates certain parts of an exemplary guide robot according to various embodiments of the present disclosure.

In some embodiments, the driving device 1 may include the walking base-frame 1a illustrated in FIGS. 1-3. The driving device 1 may also include a speed control device 1b for driving the walking base-frame 1a to move/walk. By controlling the walking/moving speed of the walking base-frame 1a, the walking speed of the guide robot may be controlled. In some embodiments, the speed control device 1b may be implemented through, e.g., programmable logic controllers (PLC) and/or a controller with suitable software. The specific means to implement the driving device 1 should be determined according to different applications and/designs, and should not be limited by the embodiments of the present disclosure. The walking base frame 1a may be configured to move the guide robot at a desired walking speed. The moving/walking speed of the walking base-frame 1a may be the same as the walking speed of the guide robot.

In the disclosed embodiments, controlling the walking speed of the guide robot to match the walking speed of the user refers to that, the walking speed of the guide robot is controlled to be at least approximately the same as the walking speed of the user.

In some embodiments, a comparator circuit may be arranged in the driving device 1. The comparator circuit may receive the user's walking speed detected by the speed sensor 2 and the walking speed of the walking base-frame 1a, and send the difference between the user's walking speed and the walking speed of the walking base-frame 1a to the speed control device 1b. The speed control device may adjust the walking speed of the walking base-frame 1a so that the walking speed of the walking base-frame 1a may be at least approximately the same as the user's walking speed.

In some other embodiments, the speed sensor 2 may be a device capable of sensing the user's relative location and determining the user's walking speed based on the user's real-time location. For example, the speed sensor 2 may be an infrared (IR) sensor incorporating or in connection with suitable logic circuit and/or a controller. The speed sensor 2 may also include an image sampling device to sample the user's images. The images may be processed by the logic circuit and/or the controller to determine the user's walking speed.

In some embodiments, the speed sensor 2 may be arranged on the walking base-frame 1a. In some embodiments, the speed sensor 2 may be arranged on the robot body 3. In some other embodiments, the speed sensor 2 may be arranged both on the walking base-frame 1a and the robot body 3. Arranging the speed sensor 2 on the walking base-frame 1a may enable the speed sensor 2 to more successfully detect the user's walking speed. If the speed sensor 2 is arranged at another position, e.g., on top of the guide robot, the speed sensor 2 may not detect the user because of the user's height. In this case, the speed sensor 2 may not successfully detect the user's waking speed.

Besides the driving device 1 and the speed sensor 2, the disclosed guide robot may also be configured in one or more other ways, as illustrated below, to further improve the performance of the guide robot. User experience may be improved.

In some embodiments, as shown in FIGS. 2-3, the guide robot may include a handle 4 and a handle control device 5.

The handle control device 5 may drive the handle 4 to move up and down when the guide robot enters an activated state or activated mode. When the handle control device 5 receives a stop command, the handle control device 5 may stop moving the handle 4 up and down. In the present disclosure, the activated state of the guide robot is relative to the standby state of the guide robot. In standby state, the main functional modules of the guide robot may not be in functioning state. When the guide robot enters activated state from standby state, a triggering signal may trigger each functional module to be in functioning state.

The handle 4 may output a stop command to the handle control device 5 when the handle 4 detects the user's hand being placed on the handle 4.

The advantages of the abovementioned arrangement may include the follows. After the guide robot is activated, the handle control device 5 may automatically move the handle 4 up or down so that it may be more convenient for the user to reach or hold the handle 4. After the user holds the handle 4, the handle control device 5 may stop moving the handle 4.

Specifically, a human-body sensing device may be arranged on the handle 4 to sense the user's hand. The human-body sensing device may be, e.g., an IR sensor. When senses the user's hand, the human-body sensing device may output a certain voltage level, e.g., high voltage level, to the handle control device 5 as the stop command.

The specific arrangement of the handle control device 5 should be determined according to different applications and/or designs, and should not be limited by the embodiments of the present disclosure. FIG. 3 illustrates another exemplary handle control device 5. The handle control device 5 may include a guide track and a motor (now shown). The guide track may be arranged along the vertical direction. The handle 4 may be arranged on the guide track. The motor may drive the handle 4 to move up and down along the guide track.

Further, to make it easier for the user to reach and hold, as shown in FIGS. 2 and 3, the handle 4 may have a circular shape arranged around the robot body 3 or along the outer periphery of the robot body 3. In some embodiments, the robot body 3 may have a cylinder shape.

Figure 4:
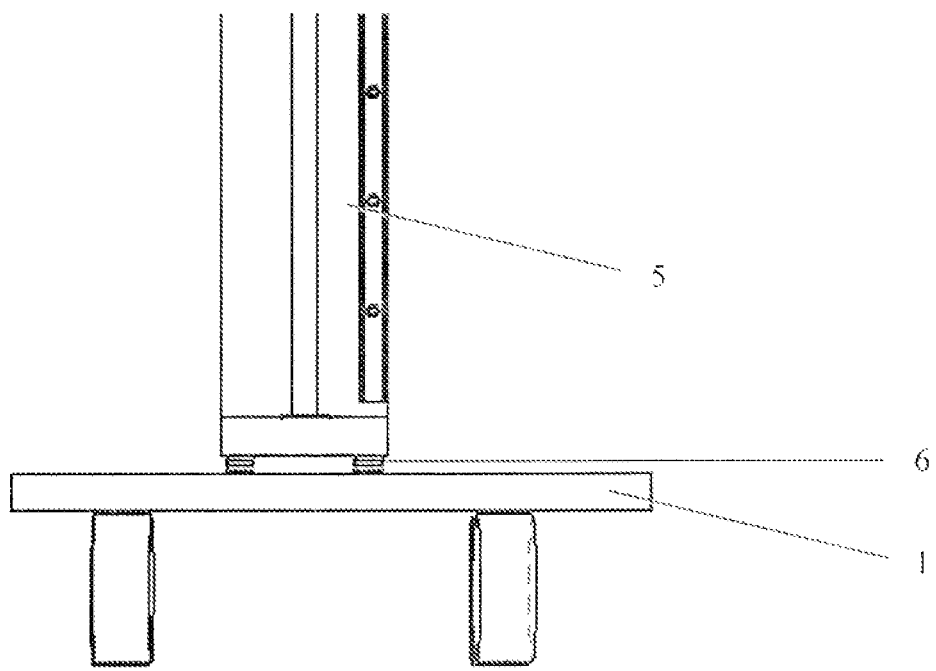
FIG. 4 illustrates certain parts of an exemplary guide robot according to various embodiments of the present disclosure.

In some one embodiments, when the driving device 1, as shown in FIGS. 1-3, includes a walking base-frame and a speed control device, the robot body 3 of the guide robot may be arranged over the walking base-frame 1a. FIG. 4 illustrates such an arrangement.

The guide robot may also include a flexible connecting device 6. The flexible connecting device 6 may provide elastic connection or flexible connection between the walking base-frame 1a and the robot body 3 so that the walking base-frame 1a and the robot body 3 may slide relative to each other along the horizontal direction.

By arranging the flexible connection between the walking base-frame 1a and the robot body 3, the user is less likely to knock over the guide robot when the user is walking too fast or too slow. In some embodiments, the speed sensor 2 may sense the pulling direction of the flexible connecting device 6. The speed sensor 2 may determine if the user's walking speed is faster or slower than the walking speed of the guide robot so that the speed sensor 2 may adjust the walking speed of the guide robot to be approximately the same as the user's walking speed.

In some embodiments, the guide robot may include a voice reminder device 7. The voice reminder device 7 may output a voice message to remind the user the position of the handle 4 when the guide robot is activated.

Reminded by the voice message, the user may determine the location of the guide robot in time. In some embodiments, when activated, the guide robot may input a triggering command to the voice reminder device 7 such that the voice reminder device 7 may output a voice message. The voice reminder device 7 may include a speaker or other suitable broadcasting devices. In some embodiments, as shown in FIG. 2, the voice reminder device 7 may be arranged on the handle 4.

In some embodiments, the guide robot may further include a voice recognition device to recognize the user's voice and activate the guide robot based on the user's voice.

Thus, the voice recognition device may enable the guide robot to be activated by the user by voice.

In some embodiments, the voice recognition device may be configured to recognize the volume of the user's voice. In some embodiments, when the volume of the user's voice is higher than a preset volume value, the guide robot may be activated. Alternatively, the voice recognition device may also be configured to recognize the content of the user's voice. In some embodiments, when the content of the user's voice satisfies a preset content stored in the guide robot, the guide robot may be activated. For example, when the user's voice includes "activating the guide robot", the guide robot may be activated. Further, the voice recognition device may further include a voiceprint recognition device. In this case, the guide robot may be activated only when receiving the voice of a particular user. The above arrangement may avoid activating the guide robot by mistake. In some embodiments, the voice recognition device may be implemented using a microphone and a suitable voice processing software. The voice recognition device may be arranged on the handle 4. In one embodiment, the voice recognition device may be arranged together with the voice reminder device 7.

Further, in some embodiments, the driving device 1 may determine the user's location based on the user's voice and drive the guide robot to move to the user's location.

By moving to the user's location based on the user's voice, the guide robot may automatically move to the user's location.

In some embodiments, the guide robot may include an obstacle avoidance sensor. The obstacle avoidance sensor 2' may be configured to detect whether an obstacle is in the way of the guide robot. When there is an obstacle in the way, the driving device 1 may change the walking route of the guide robot so that the guide robot may avoid the detected obstacle. The obstacle avoidance sensor may be integrated with the speed sensor 2 or may be a separate device.

By placing an obstacle avoidance sensor 2' on its body, the guide robot may automatically avoid obstacles. The guide robot may be any suitable sensor capable of sensing obstacles. For example, the obstacle avoidance sensor 2' may be a camera, an infrared sensor, and/or a laser sensor. After detected an obstacle, the obstacle avoidance sensor 2' may send a signal to the driving device 1. The driving device 1 may determine an obstacle is located in the way of the guide robot and may adjust/modify the walking route of the guide robot.

In one embodiment, the obstacle avoidance sensor 2' may be arranged on the lower portion of the robot body 3, being close to the driving device 1, as shown in FIGS. 1 and 2. Thus, the obstacle avoidance sensor 2' may also sense the relatively low/small obstacles.

In one embodiment, the guide robot may include a radar device 10. The radar device 10 may be configured to sense objects surrounding the guide robot. The driving device 1 may also create a map of the environment surrounding the guide robot based on the objects sensed by the radar device 10. The driving device 1 may also control the walking route of the guide robot based on the created map.

By using the radar device 10, the walking route of the guide robot may be planned automatically and the guide robot may automatically guide the user to move forward. The process to create a map of the environment surrounding the driving device 1 based on information of the surrounding objects should be known to those skilled in the art and is not repeated herein.

In some embodiments, the guide robot may further include an image sampling device 8, a voice output device, and a communication device. The voice output device and the communication device are not shown in the figures.

The image sampling device 8 may be configured to sample images surrounding the guide robot. The communication device may be configured to transmit the images sampled by the image sampling device 8 to a remote location, e.g., a remote terminal. The communication device may also be configured to receive voice from a remote terminal. The voice output device may output the voice received by the communication device.

By arranging an image sampling device, a voice output device, and a communication device, images from a remote terminal may be transmitted to the guide robot, and images reflecting the surroundings of the guide robot may be transmitted to the remote terminal, so that the remote terminal may communicate with the persons surrounding the guide robot. The image sampling device may be, e.g., a camera. The camera may be arranged on the top of the robot body 3, as shown in FIGS. 2 and 3. The voice output device may be, e.g., a speaker, and may be arranged on or near the handle 4. In some embodiments, the voice output device and the voice reminder device may be the same device.

In some embodiments, the guide robot may further include a sound sampling device and/or a display device 9. The sound sampling device is not shown in the figures. The sound sampling device may be configured to sample the sound surrounding the guide robot. When a sound sampling device is included in the guide robot, the communication device may also be configured to receive images sent from a remote terminal. Thus, the sounds surrounding the guide robot, e.g., voices from the user or person helping the user, may be sampled and sent to the remote terminal to facilitate communication between the remote terminal and the voices surrounding the guide robot. When a display device 9 is include in the guide robot, the communication device may also be configured to receive images sent from the remote terminal, and the display device 9 may be configured to display the images received by the communication device. Accordingly, persons surrounding the guide robot may see the images sent from the remote terminal and communicate with the remote terminal.

In some embodiments, the communication device may include a 3G/4G module. The user may call a remote terminal and be connected to the remote terminal through the communication device so that communication between the user and the remote terminal may be facilitated.

Figure 5:
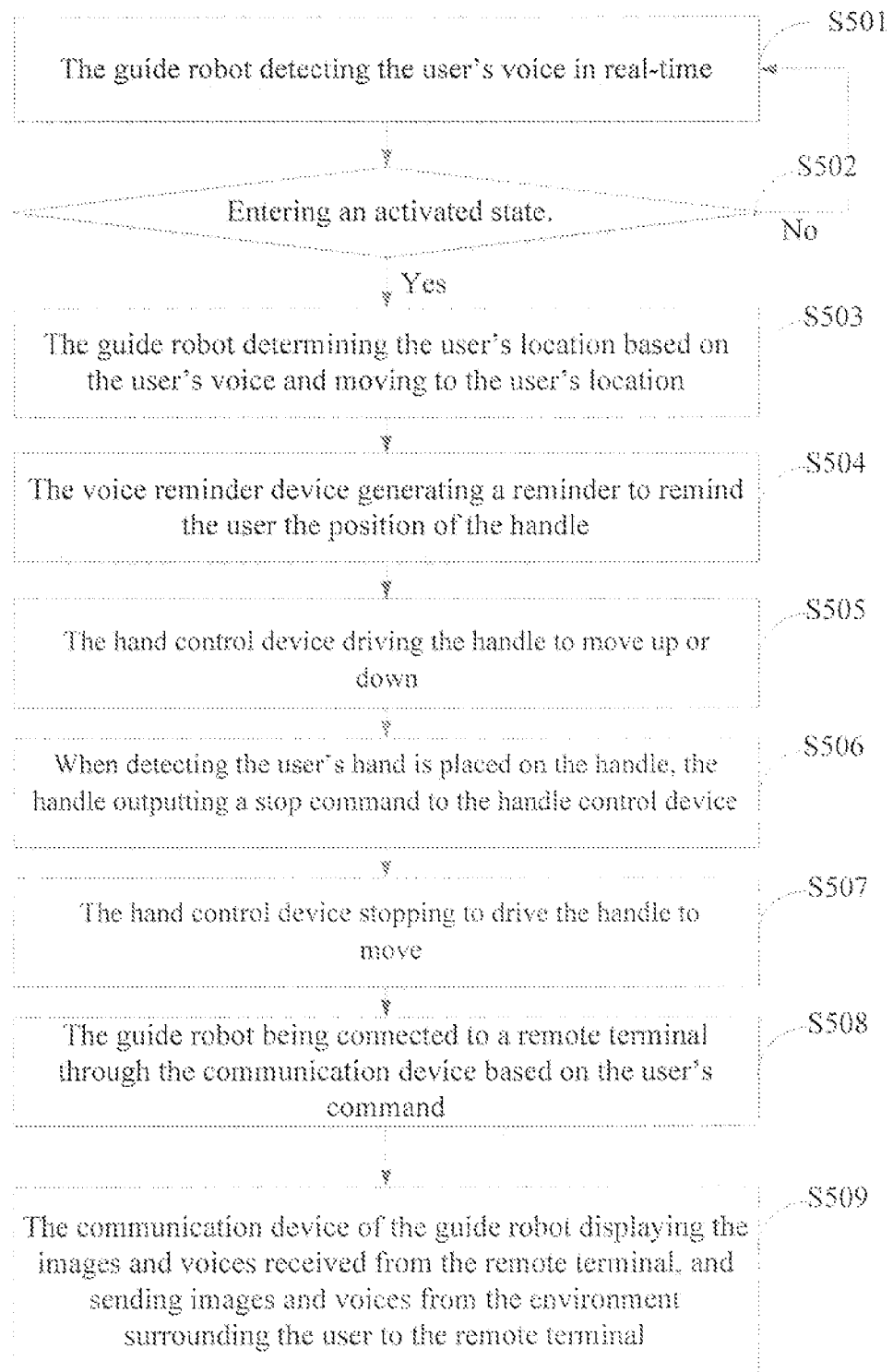
FIG. 5 illustrates an exemplary flow chart of operation of a guide robot according to various embodiments of the present disclosure.

In various embodiments, the parts and operations described above may be combined flexibly according to different applications and/or designs. The specific combination should not be limited by the embodiments of the present disclosure. A process to operate the disclosed guide robot is shown in FIG. 5. As shown in FIG. 5, the process may include steps S501-S509.

In step S501, the guide robot may detect the user's voice in real-time. For example, a user may give a number of voice command, summoning the guide robot. A user may also use a voice command to call out for help by the guide robot.

In step S502, the guide robot may determine whether the guide robot is entering an activated state. If the guide robot is entering the activated state, the process may proceed to step S503. If the guide robot is not entering the activated state, the process may proceed from step S501.

In step S503, the guide robot may determine the user's location based on the user's voice and move to the user's location.

In step S504, the voice reminder device may generate a reminder to remind the user the position of the handle.

In step S505, the handle control device may drive the handle to move up or down.

In step S506, when detecting the user's hand is placed on the handle, the handle may output a stop command to the handle control device.

In step S507, the handle control device may stop driving the handle to move.

In step S508, the guide robot may be connected to a remote terminal through the communication device based on the user's command.

In step S509, the communication device of the guide robot may display the images and voices received from the remote terminal, and may send images and voices from the environment surrounding the user to the remote terminal.

Figure 6:
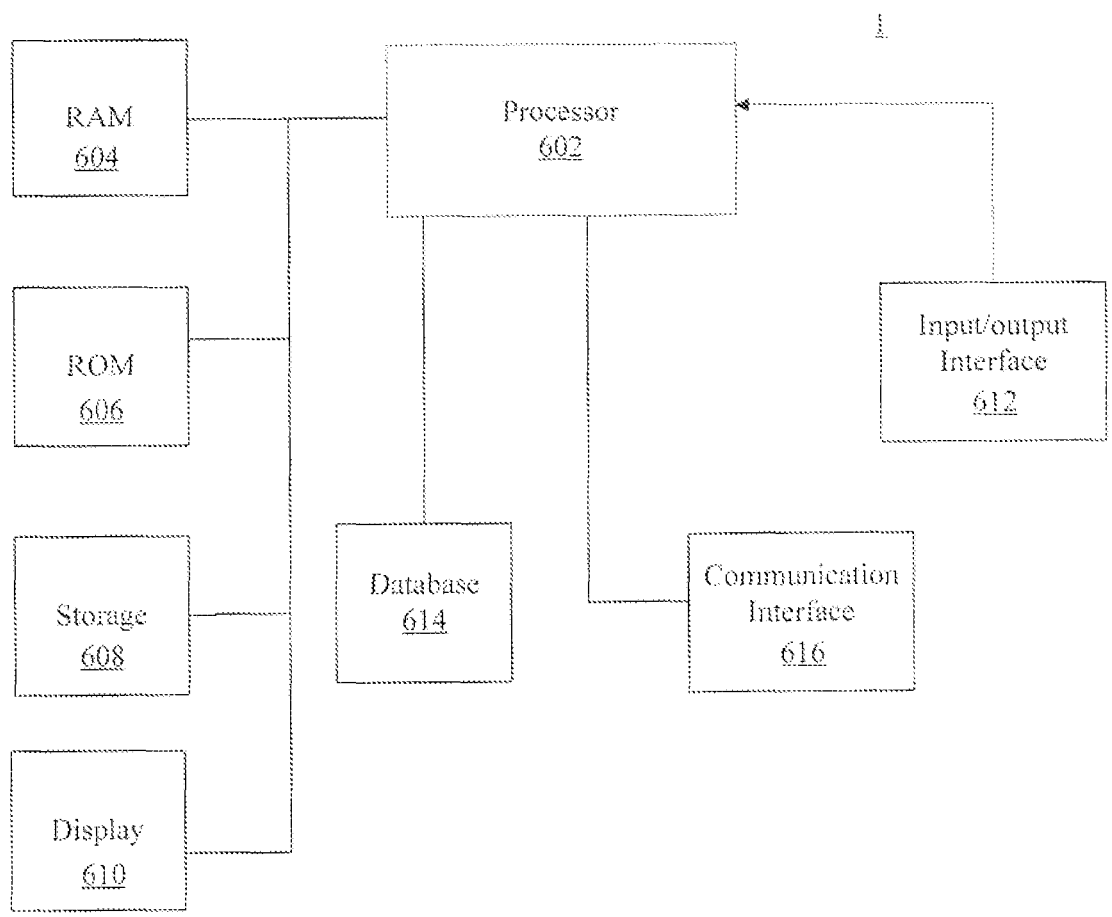
FIG. 6 illustrates a block diagram of a driving device used in various embodiments of the present disclosure.

FIG. 6 illustrates a block diagram of the driving device 1 used in various embodiments of the present disclosure. Different parts of the driving device 1 may be connected to or be incorporated in various components and/or parts of the guide robot to implement desired functions.

The driving device 1 may receive, process, and execute commands from the display apparatus. The driving device 1 may include any appropriately configured computer system. As shown in FIG. 12, driving device 1 may include a processor 602, a random access memory (RAM) 604, a read-only memory (ROM) 606, a storage 608, a display 610, an input/output interface 612, a database 614, and a communication interface 616. Other components may be added and certain devices may be removed without departing from the principles of the disclosed embodiments.

Processor 602 may include any appropriate type of general purpose microprocessor, digital signal processor or microcontroller, and application specific integrated circuit (ASIC). Processor 602 may execute sequences of computer program instructions to perform various processes associated with driving device 1. Computer program instructions may be loaded into RAM 604 for execution by processor 602 from read-only memory 606, or from storage 608. Storage 608 may include any appropriate type of mass storage provided to store any type of information that processor 602 may need to perform the processes. For example, storage 608 may include one or more hard disk devices, optical disk devices, flash disks, or other storage devices to provide storage space.

Display 610 may include display 9 and may provide information to a user or users of the driving device 1. Display 610 may include any appropriate type of computer display device or electronic device display (e.g., CRT or LCD based devices). Input/output interface 612 may be provided for users to input information into driving device 1 or for the users to receive information from driving device 1. For example, input/output interface 612 may include any appropriate input device, such as a keyboard, a mouse, an electronic tablet, voice communication devices, touch screens, or any other optical or wireless input devices. In some embodiments, the input/output interface 612 may also include sensors, such as the speed sensor 2, obstacle avoidance sensor 2', and the radar device 10. The user may input information into driving device 1 through interacting with these sensors. Further, input/output interface 612 may receive from and/or send to other external devices.

Further, database 614 may include any type of commercial or customized database, and may also include analysis tools for analyzing the information in the databases. Database 614 may be used for storing information for detecting obstacles, transmitting/receiving images and voices, and other related information. Communication interface 616 may provide communication connections such that driving device 1 may be accessed remotely and/or communicate with other systems through computer networks or other communication networks via various communication protocols, such as transmission control protocol/internet protocol (TCP/IP), hyper text transfer protocol (HTTP), etc. Communication interface 616 may include the communication device describe above.

In one embodiment, the user may give voice commands to the guide robot. The voice recognition device may receive the user's voice through the input/output interface 612 and send the user's voice to the processor 602. The user's voice may be processed by the processor 602 and the guide robot may enter an activated state. Meanwhile, the speed sensor 2 of the guide robot may send information reflecting the user's location to the processor 602 so that the processor 602 may perform certain calculation to determine the user's real-time location. Further, the processor 602 may send a command, pre-programmed and stored in the RAM 604 to the walking base-frame 1*a* to move to the user's location. After the guide robot moves to the user's location, the processor 602 may send a command, pre-programmed and stored in the RAM 604, to the voice reminder device 7 so that the voice reminder device 7 may send a voice message to the user informing the position of the handle 4. Meanwhile, the processor 602 may send a command, pre-programmed and stored in the RAM 604, to the handle control device 5 to move the handle 4 up and down. When detecting the user's hand placed on the handle 4, the handle 4 may send information reflecting the position of the user's hand to the processor 602 so that the processor 602 may send a stop command, pre-programmed and stored in the RAM 604, to the handle 4 to stop the movement of the handle 4.

When the user, holding the handle 4, starts to walk along a certain direction, input/output interface 612, e.g., the speed sensor 2, may detect the user's walking speed and send data reflecting the user's walking speed to the processor 602. The processor 602 may determine the difference between the user's walking speed and the walking speed of the guide robot, e.g. through a comparison calculation using a comparator circuit. The processor 602 may increase or decrease the walking speed of the guide robot based on the speed difference, and send the increased/decreased speed to the speed control device 1*b* so that the speed control device 1*b* may control the speed of the guide robot to be approximately the same as the user's walking speed.

In some embodiments, the user may send a request to connect to a remote terminal, in the form of a voice command, to the voice recognition device 7. The voice recognition device 7 may sample the voice command and send the sampled data to the processor 602. The processor 602 may process the sampled data and establish wireless connection with the remote terminal through the communication interface 616 (e.g., communication device). The protocols of the connection may be stored in the database 614 and/or storage 608. After the connection is established, the guide robot may display a message on the display 610 showing that the connection has been established. Further, the user may start recording voice messages or images of the surroundings using voice commands. In response to the user's commands, the processor 602 may, e.g., send commands to the image sampling device 8, so that the image sampling device 8 may take pictures of the surroundings. The pictures may be processed by the processor 602 and sent to the remote terminal through the communication interface 616.

Figure 7:
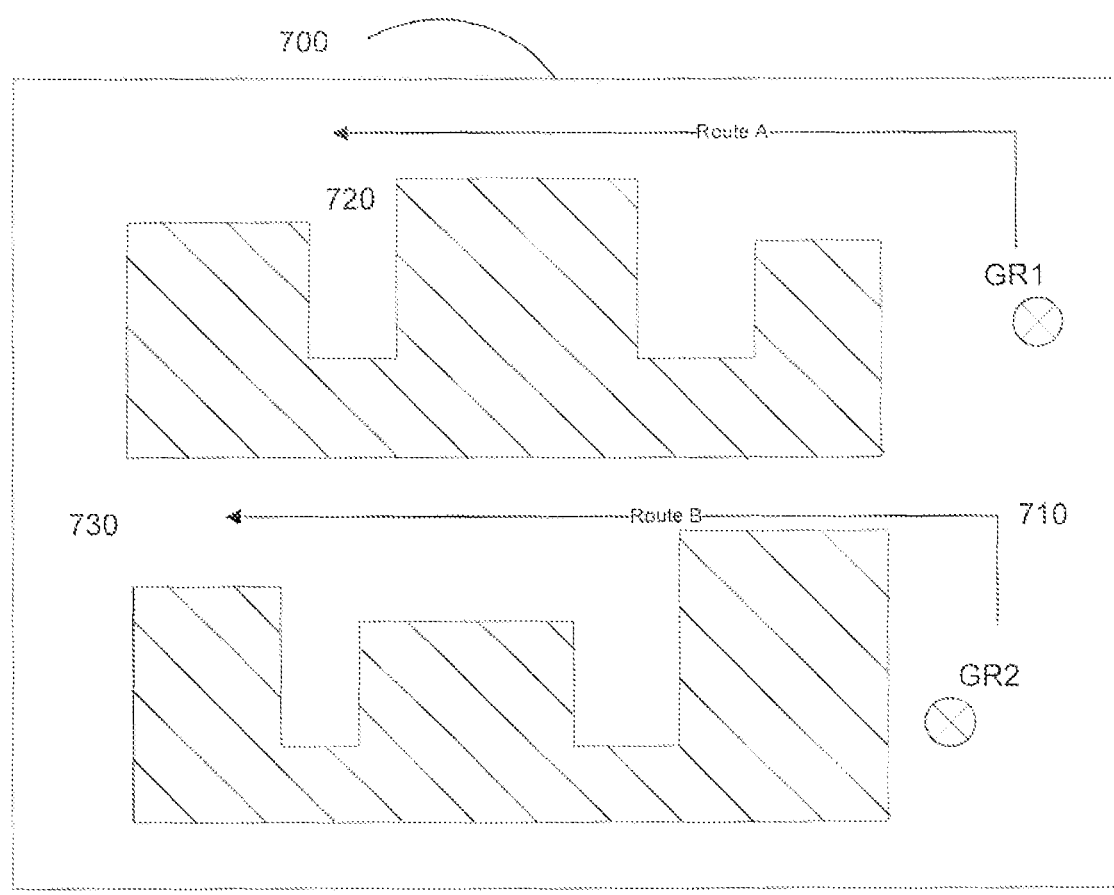
FIG. 7 illustrates another exemplary implementation of guide robots according to various embodiments of the present disclosure.

In some embodiments, a plurality of the guide robots may be used in indoor environments to guide visually impaired people to complete specific tasks. For example, the guide robots may be used in museums, subway stations, hospitals, hotels, etc. to help guide a person from a starting position to a destination in a large space. FIG. 7 shows an example of two guide robots GR1 and GR2 in a large space 700, ready to guide visual impaired users through the lined obstacles, walls, etc. The data defining the layout of the building are stored in the storage or memory of the guide robots GR1 and GR2, or in a remote terminal controlling guide robots GR1 and GR2. GR1 and GR2 are both connected to and controlled by a remote terminal through their communication devices.

The guide robots may enable the user to summon the robot after entering the building at space 710 through the voice recognition device 7. In some embodiments, the guide robot may allow the user to choose from different modes of assistance (e.g., sighted guide, vision impaired guide, or information kiosk) through display 9 and/or the voice recognition device 7. In some embodiments, the guide robot may also provide information about the building's layout to the user through display 9 and/or the voice reminder 7.

For example, two users may enter the room 700 in the foyer 710 and request for the guide robots. Guide robot GR1 may respond to the first user. Guide robot GR 2 may receive data from the remote terminal indicating that GR1 has responded to the first user. Guide robot GR 2 may respond to the second user's request. The guide robots GR1 and GR2 may inform the users about the shape of the space, the passageways, etc. of space 700.

After providing the building layout information, the guide robots may ask the user, if relevant, whether she prefers to certain route, such as use the stairs or the elevator. Once the user started walking, the guide robot should alert the user when approaching obstacles based on the map date or data collected by obstacle avoidance sensor 2' or radar device 10. The guide robot may further alert the user of narrow passages (e.g., doorways), changes in direction (e.g., turns), or changes in the surface level (e.g., stairs or ramps), which can be based on the map data stored in its memory or real time data collected by the radar device 10 and obstacle avoidance sensor 2'. During the assisted walk, the guide robot may tell users which rooms they were walking by: "on the right is a computer lab for data testing;" "on the left are the restrooms;" etc. This information may also be based on the map data stored in the guide robot.

For example, the first user has designated position 720 as the destination. Position destination may be a meeting area. The second user may designate position 730 as the destination. Guide robot GR1 may then determine to guide the first user to 720 through route A. Guide robot GR 2 (or the remote terminal) may receive the route data from guide robot GR 1 and direct guide robot GR 2 to take route B to destination 730. The routing decision of the guide robots may be based on user input, based on the traffic flow data in room 700, such that guide robots may avoid traffic and take an optimal route when guiding the visually impaired users to their destinations. The traffic flow data may reflect people movements in the space as well as the movements of the other guide robots in the space. The traffic flow data may be monitored in real time by the remote terminal and the guide robots.

In some embodiment, after the user reaches the destination, the guide robot may be instructed to return to the current location in a specified amount of time. For example, if the first user is attending a one-hour meeting, she would tell the robot to return to 720 in one hour to guide her back to the exit of the building 710.

In some embodiments, the guide robots may be designed to be in other shapes to accommodate user's need. For example, the guide robot may be shorter than a person's height and handle 4 of the guide robot may be a shape of a upward dog leash. In this case, the guide robot may resemble the shape of a guide dog. In some embodiments, the guide robot may have a height adjustable robot body 3 so that is can be adjusted to be used by people of different heights (e.g., adults, children, etc.).

In practice, the embodiments would not affect each other. Any combination of any number of the embodiments should also be within the scope of the present disclosure.

In the present disclosure, details are provided for the description of the embodiments. However, the embodiments may also be implemented without specific details. In some embodiments, methods, structures, and techniques already known to those skilled in the art are not elaborated to better illustrate the disclosed device and method.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A system for managing guide robots in a defined space, comprising a remote control terminal and a plurality of guide robots;
   wherein a guide robot of the plurality of guide robots comprises:
   a speed sensor configured for detecting a user's walking speed;
   a driving device configured for controlling a moving speed of the guide robot so that the moving speed of the guide robot is compatible with the user's walking speed, wherein the driving device comprises a walking base-frame for moving the guide robot and a speed control device for controlling a moving speed of the walking base-frame, the moving speed of the walking-base frame being the moving speed of the guide robot;
   a robot body, wherein the speed sensor and the driving device are placed on or in the robot body;
   a handle;
   a handle control device configured to automatically move the handle up and down relative to the robot body in absence of a user command and when the guide robot is activated, and configured to stop the handle from automatically moving upon detection of a user's hand being placed on the handle; and
   a flexible connecting device flexibly connects the walking base-frame and the robot body, such that the walking base-frame and the robot body may slide relative to one another along a horizontal direction
   wherein the remote control terminal stores data mapping objects in the defined space, the objects including fixed objects and moving objects in the defined space;
   the guide robot responds to a user's voice command;
   the guide robot adjusts a handle position based on an input from the user;
   the guide robot detects a walking speed of the user and adjusts its own moving speeding accordingly; and
   the remote terminal controls the plurality of guide robots based on users' voice commands and the data mapping objects in the defined space.

2. The system according to claim 1, wherein the handle control device comprising a track rail along a vertical direction and a motor, the handle having a circular shape surrounding the robot body,
   wherein:
   the handle is arranged on the track rail to move up and down along the track rail; and
   the motor is configured to drive the handle to move along the track rail.

3. The system according to claim 1, wherein the speed sensor is placed on the walking base-frame.

4. The system according to claim 1, further comprising a voice reminder device, configured for reminding the user a location of the guide robot in response to the guide robot being activated.

5. The guide robot system according to claim 1, further comprising a voice recognition device, configured for recognizing a user's voice and activating the guide robot in response to the user's voice being recognized.

6. The guide robot system according to claim 5, wherein the driving device is configured to determine a user's location based on the user's voice and drive the guide robot to the user's location.

7. The system according to claim 1, further comprising an obstacle avoidance sensor configured for detecting whether an obstacle is located in a route of the guide robot, wherein:

in response to detection of an obstacle in the route of the guide robot by the obstacle avoidance sensor, the driving device is configured to adjust the route of the guide robot to avoid the obstacle.

8. The system according to claim 1, further comprising a radar device for scanning objects surrounding the guide robot, wherein:
the driving device generates a map reflecting a surrounding environment of the guide robot based on objects scanned by the radar device, and controls a route of the guide robot based on the map.

9. The system according to claim 1, further comprising:
an image sampling device, configured for sampling images surrounding the guide robot;
a communication device, configured for sending sampled images to a remote terminal and receive a voice message sent from the remote terminal; and
a voice output device, configured for outputting the voice message received by the communication device.

10. The system according to claim 9, further comprising a sound sampling device configured for sampling sound surrounding the guide robot.

11. The system according to claim 9, further comprising a display device configured for displaying images received by the communication device from the remote terminal.

12. The system according to claim 1, wherein the robot body is a cylinder shape.

* * * * *